(12) United States Patent
Watanabe et al.

(10) Patent No.: US 7,963,709 B2
(45) Date of Patent: Jun. 21, 2011

(54) ELECTRONIC DEVICE

(75) Inventors: Kiyoshi Watanabe, Ome (JP); Motome Osawa, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 771 days.

(21) Appl. No.: 11/998,138

(22) Filed: Nov. 28, 2007

(65) Prior Publication Data
US 2008/0130208 A1 Jun. 5, 2008

(30) Foreign Application Priority Data

Dec. 1, 2006 (JP) .................................. 2006-325218
Aug. 24, 2007 (JP) .................................. 2007-217740

(51) Int. Cl.
*B41J 5/00* (2006.01)
(52) U.S. Cl. ....................................... 400/472; 345/168
(58) Field of Classification Search .................. 400/472; 361/679.08–679.2; 345/168
See application file for complete search history.

(56) References Cited

U.S. PATENT DOCUMENTS

| | | | | |
|---|---|---|---|---|
| 4,558,427 A * | 12/1985 | Takeuchi et al. | ......... | 361/679.09 |
| 5,717,431 A * | 2/1998 | Chia-Ying et al. | ............ | 345/168 |
| 6,336,614 B1 * | 1/2002 | Kwitek | ......................... | 248/118 |
| 6,610,944 B2 * | 8/2003 | Lee et al. | .................... | 200/302.1 |
| 6,621,485 B1 * | 9/2003 | Slotta | ............................ | 345/168 |
| 6,671,171 B1 * | 12/2003 | Homer et al. | ............ | 361/679.09 |
| 6,718,188 B1 * | 4/2004 | Ohira et al. | ................. | 455/575.1 |
| 7,083,342 B2 * | 8/2006 | Griffin | .......................... | 400/485 |
| 7,212,399 B2 * | 5/2007 | Kee et al. | ................ | 361/679.09 |
| 7,322,759 B2 * | 1/2008 | Rak et al. | ....................... | 400/486 |
| 7,404,682 B2 * | 7/2008 | Dombrowski et al. | ....... | 400/490 |
| 7,505,798 B2 * | 3/2009 | Hofer et al. | ................ | 455/575.1 |
| 7,535,699 B2 * | 5/2009 | Hamada et al. | .......... | 361/679.08 |
| 2001/0021098 A1 * | 9/2001 | Kambayashi | ................. | 361/680 |
| 2003/0193419 A1 * | 10/2003 | Hsu | ................................ | 341/22 |
| 2004/0012916 A1 * | 1/2004 | Wolfson | ....................... | 361/680 |
| 2005/0237702 A1 * | 10/2005 | Kee et al. | ..................... | 361/681 |
| 2006/0062624 A1 * | 3/2006 | Choi | ............................ | 400/481 |

FOREIGN PATENT DOCUMENTS

CN 1856178 A 11/2006
(Continued)

OTHER PUBLICATIONS

Japanese Office Action (and English translation thereof) dated Nov. 4, 2008, issued in a counterpart Japanese Application.
Korean Office Action dated Jun. 20, 2009 and English translation thereof issued in a counterpart Korean Application No. 10-2007-0121792.

(Continued)

*Primary Examiner* — Leslie J Evanisko
*Assistant Examiner* — David Banh
(74) *Attorney, Agent, or Firm* — Holtz, Holtz, Goodman & Chick, PC

(57) ABSTRACT

An electronic device is provided with a device housing which includes an upper case and a lower case. A key input section is provided in the device housing and includes a key sheet disposed on an inner surface of the upper case. The key sheet has a plurality of key buttons exposed in an upper surface of the upper case and a plurality of pin holes provided at a plurality of positions excluding the key buttons. And, a plurality of fitting protrusions is provided on the inner surface of the upper case and inserted into and fitted in the pin holes of the key sheet.

6 Claims, 17 Drawing Sheets

FOREIGN PATENT DOCUMENTS

| | | |
|---|---|---|
| JP | 07-336576 A | 12/1995 |
| JP | 10-004273 A | 1/1998 |
| JP | 2006-066157 A | 3/2006 |
| JP | 2006106874 A * | 4/2006 |
| JP | 2006-215667 A | 8/2006 |

OTHER PUBLICATIONS

Chinese Office Action dated Jun. 19, 2009 and English translation thereof issued in a counterpart Chinese Application No. 2007103061882.

* cited by examiner

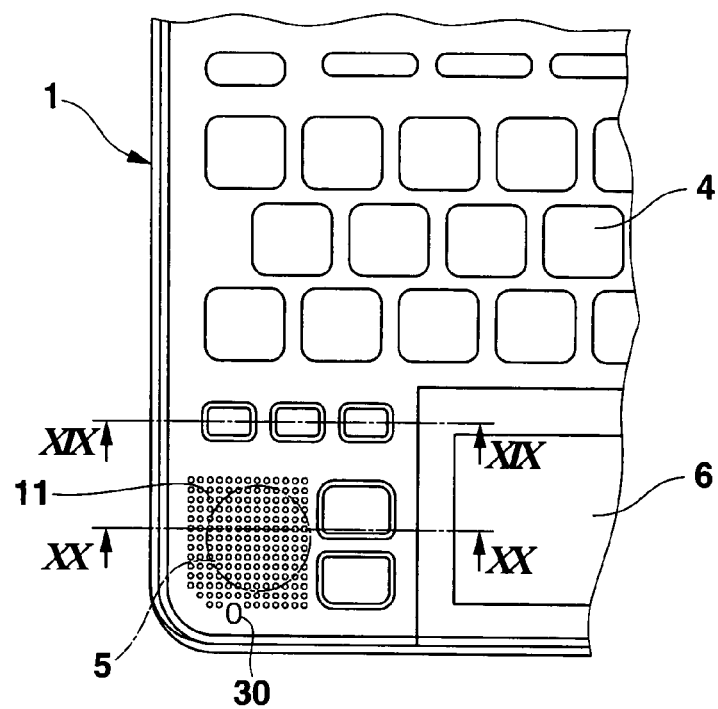
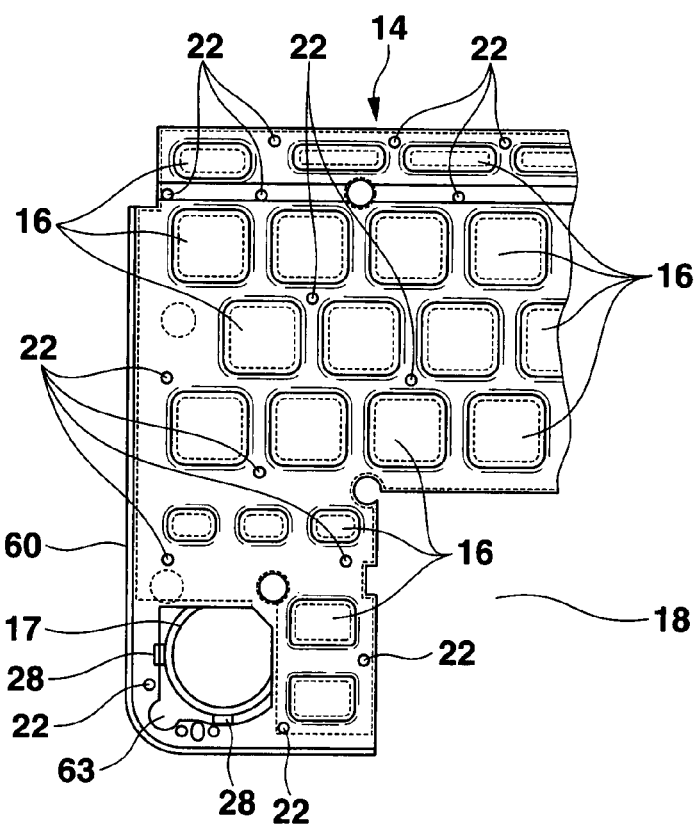

ELECTRONIC DEVICE

CROSS-REFERENCE TO RELATED APPLICATIONS

This application is based upon and claims the benefit of priority from prior Japanese Patent Applications No. 2006-325218, filed Dec. 1, 2006; and No. 2007-217740, filed Aug. 24, 2007, the entire contents of both of/all of which are incorporated herein by reference.

BACKGROUND OF THE INVENTION

1. Field of the Invention

This invention relates to an electronic device with a key input section, such as an electronic dictionary, an electronic notebook, an electronic calculator, a mobile phone, or a PDA (personal digital assistance).

2. Description of the Related Art

For example, in such an electronic device as a mobile phone described in Japanese patent Application KOKAI publication No. 10-004273, in order to reduce the number of parts, a device housing for accommodating electronic parts is configured by an upper case and a lower case and a rubber-made annular packing with a key sheet is sandwiched between a peripheral region of the upper case and that of the lower case.

Specifically, in this electronic device, the rubber-made annular packing and the key sheet are formed integrally. The rubber-made annular packing is engaged with an annular groove formed in and extending along a whole peripheral region of the upper case, and then the upper and lower cases are joined so as to press the annular packing by a pressing rib formed on and extending along a whole peripheral region of the lower case.

In such a conventional configuration, a central region of the key sheet tends to sag and is hard to be in contact with the inner surface of the upper case closely.

Therefore, when the lower case on which electronic parts are mounted is joined to the upper case in the above described state, the sagging central region of the key sheet is pressed by the electronic parts on the lower case so that the central region is easily shifted from a predetermined position and the key sheet can not be arranged in the device housing correctly.

BRIEF SUMMARY OF THE INVENTION

According to one aspect of the present invention, an electronic device comprising: a device housing which includes an upper case and a lower case; a key input section which is provided in the device housing and which includes a key sheet disposed on an inner surface of the upper case, the key sheet having a plurality of key buttons exposed in an upper surface of the upper case and a plurality of pin holes provided at a plurality of positions excluding the key buttons; and a plurality of fitting protrusions which is provided on the inner surface of the upper case and which is inserted into and fitted in the pin holes of the key sheet.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 17 is a plan view showing a part of a first device housing of an electronic dictionary according to a fifth embodiment of the present invention;

FIG. 18 is a plan view of a part of a key sheet housed in the first device housing shown in FIG. 17;

DETAILED DESCRIPTION OF THE INVENTION

First Embodiment

First, an electronic dictionary according to a first embodiment of the present invention will be explained with reference to FIGS. 1 to 5.

Figure 1:
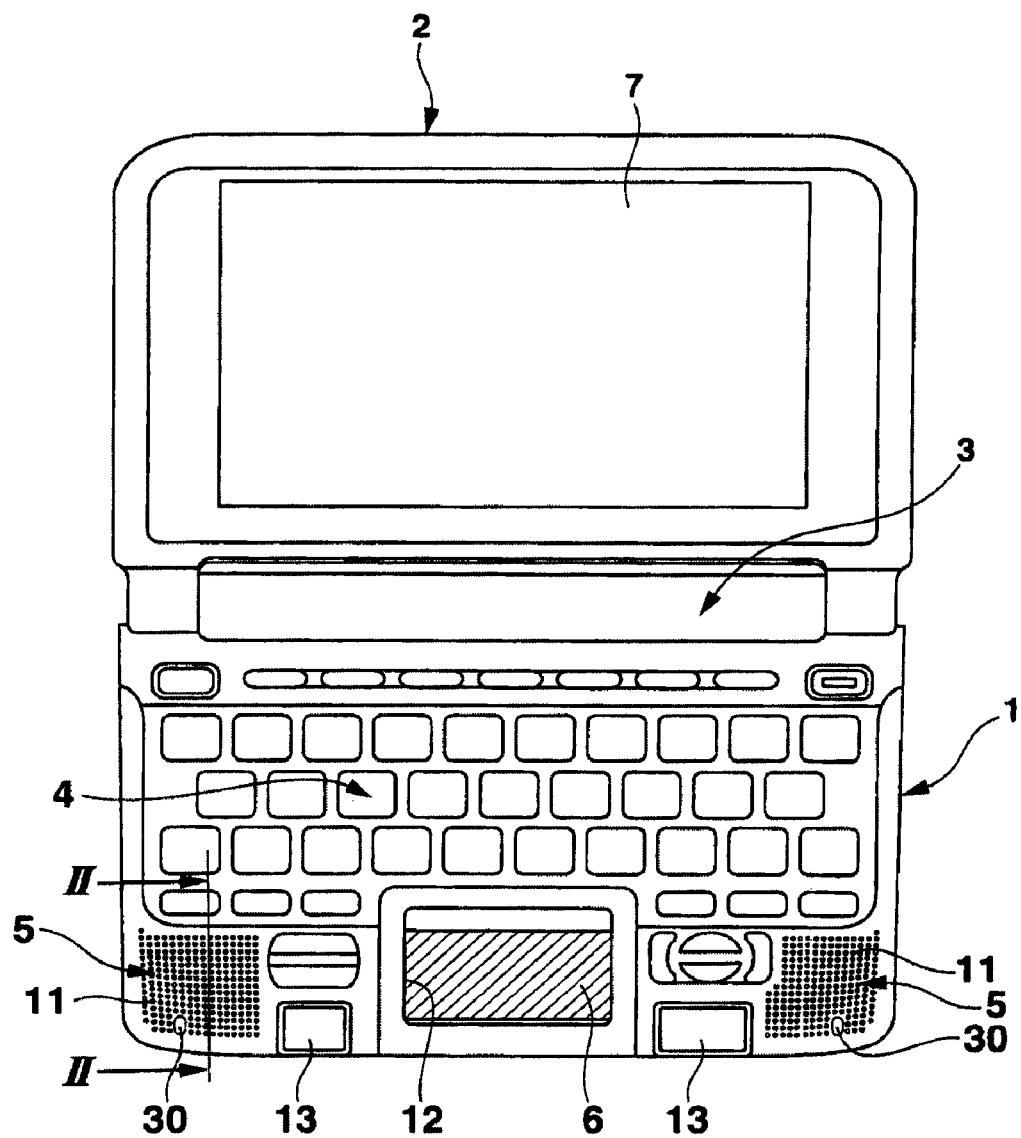
FIG. 1 is a plan view of an electronic dictionary according to a first embodiment of the present invention, wherein a first device housing and a second device housing are opened for using the electronic dictionary.

As shown in FIG. 1, the electronic dictionary includes a first device housing 1 and a second device housing 2 both of which are pivotally coupled to each other by a hinge 3.

Each of the first and second device housings 1 and 2 has a flattened box shape with the same size as to each other. As shown in FIG. 1, a key input section 4, a pair of speaker sections 5, and a touch input unit 6 are provided on an upper surface of the first device housing 1. And, a display section 7 is provided on an upper surface of the second device housing 2. The display section 7 includes a flat type display panel such as a liquid crystal display panel or an EL (electro luminescence) display panel.

Figure 2:
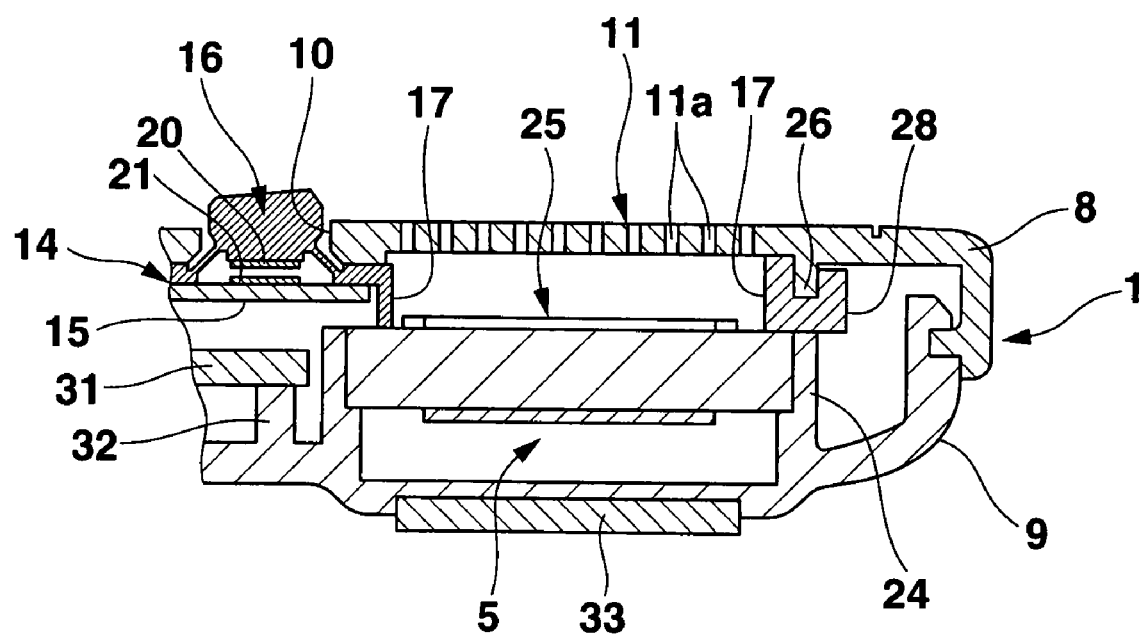
FIG. 2 is an enlarged vertical sectional view along a line II-II in FIG. 1.
Figure 3:
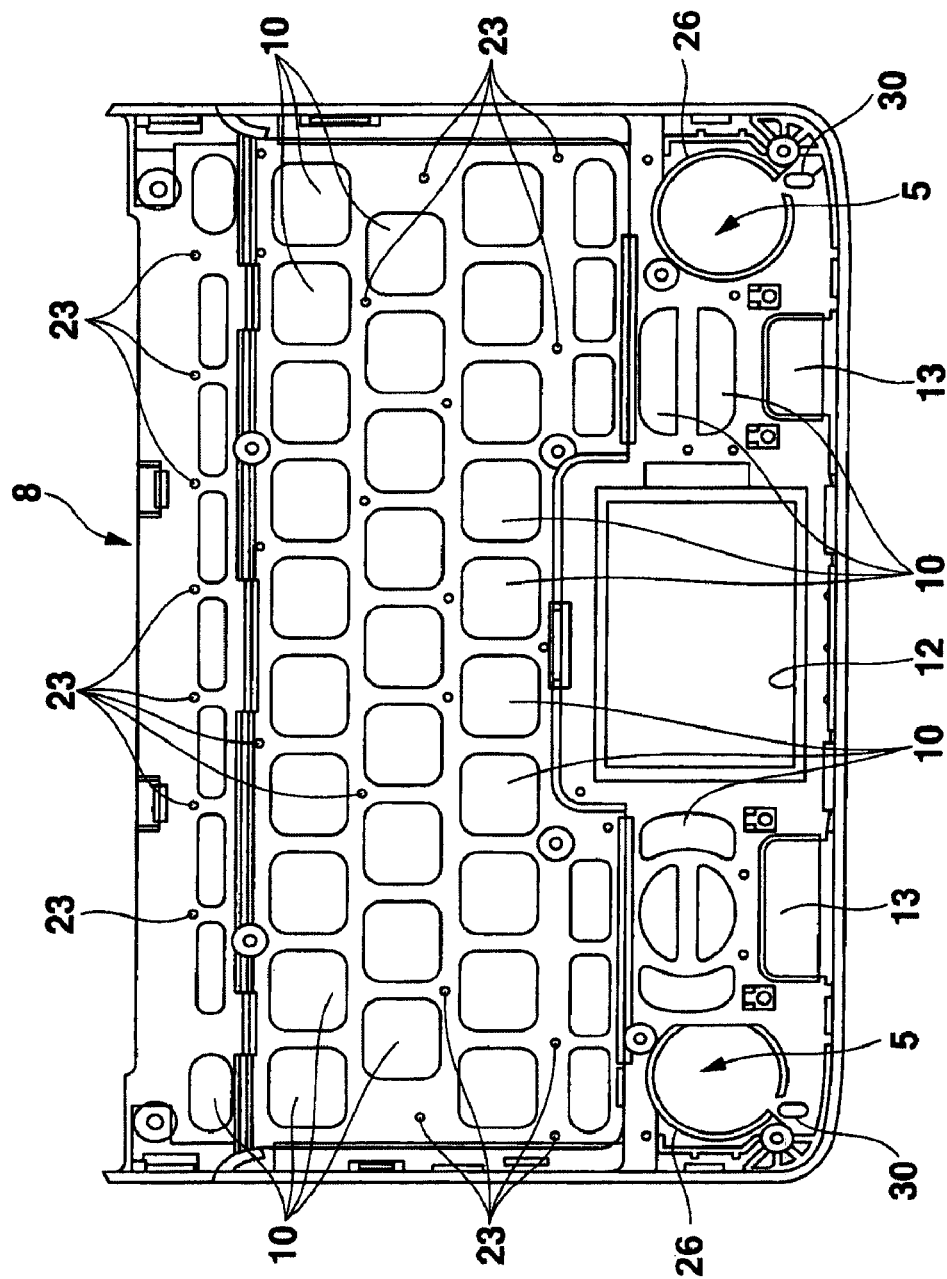
FIG. 3 is a back view of an inner surface of an upper case of the first device housing in FIG. 1.

As shown in FIG. 2, the first device housing 1 is provided with an upper case 8 and a lower case 9. As shown in FIGS. 1 and 3, key insertion holes 10 are formed in an upper surface of the upper case 8 so as to correspond to the key input section 4 and arranged lengthwise and crosswise. Two sound discharging portions 11 of the speaker sections 5 are provided in right and left sides of a free end edge of the upper surface of the upper case 8, and an input opening 12 is provided in an intermediate portion of the free end edge of the upper surface of the upper case 8 so as to correspond to the touch input unit 6. Further, switch buttons 13 included in the key input section 4 are provided between the input opening 12 and the right and left sounding discharging portions 11 in the upper surface of the upper case 8.

Figure 4:
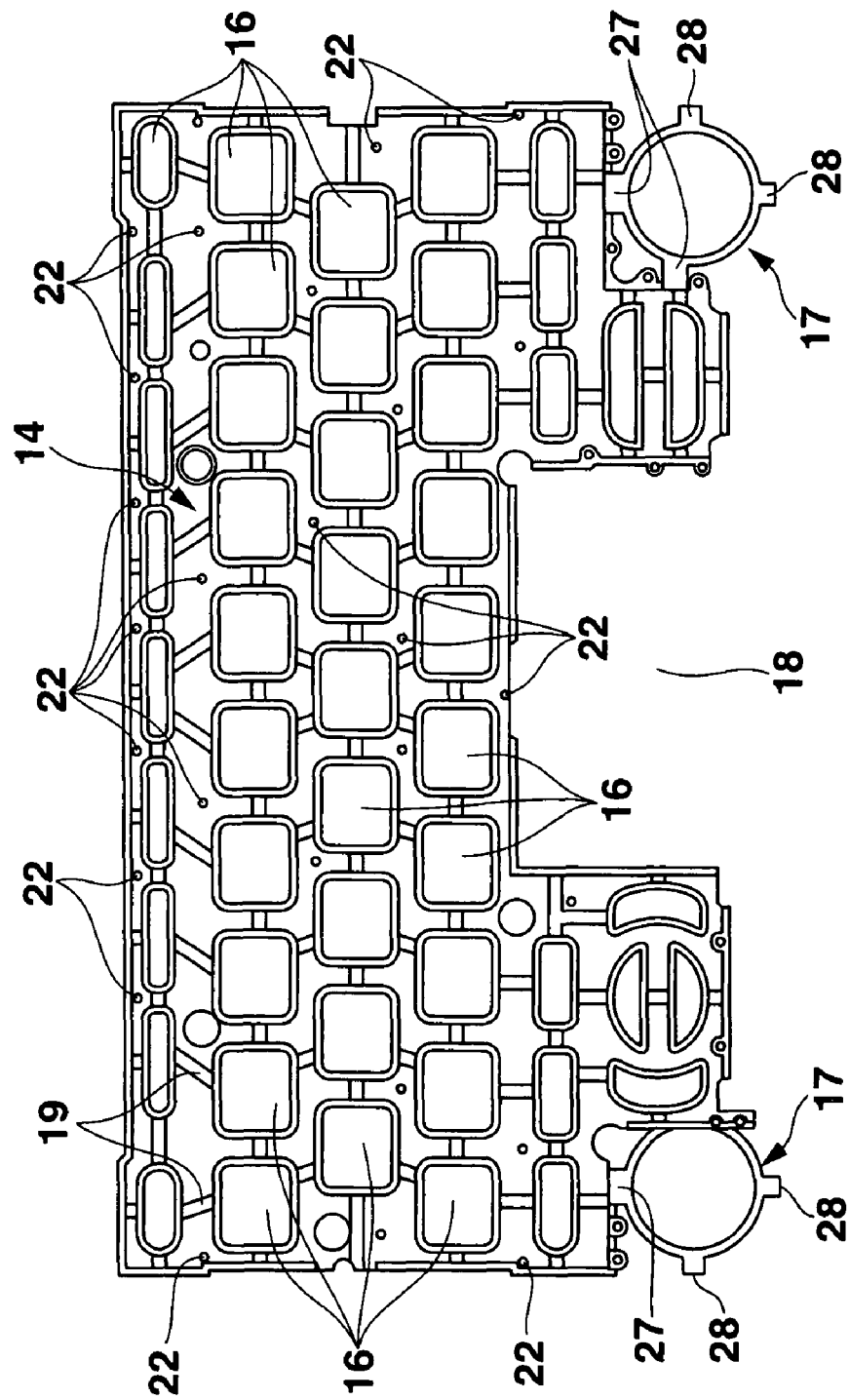
FIG. 4 is a back view of a key sheet, a part of which is shown in FIG. 2.

In FIG. 2, a key sheet 14 and a switch board 15 both of which are included in the key input section 4 are shown. The key sheet 14 is configured by a sheet having elasticity such as rubber, elastomer, or the like, and is attached to an inner surface (a lower surface in FIG. 2) of the upper case 8. As shown in FIG. 4, the key sheet 14 is integrally provided with a plurality of key buttons 16 arranged lengthwise and crosswise and speaker packing portions 17 for the speaker sections 5, and is further provided with a touch input unit insertion portion 18 so as to correspond to the touch input unit 6. Communicating grooves 19 (See FIG. 4) communicating with the key buttons 16 are provided on a back surface (a lower surface in FIG. 2) of the key sheet 14 so as to allow air flow.

The plurality of key buttons 16 includes various buttons required for dictionary functions, such as character keys, function keys, a cursor key, and the like. As shown in FIG. 2, each key button 16 is formed in an elastically-deformable dome shape. Movable contacts 20 having electrical conductivity and made from, for example, carbon or the like are provided on the inner surface (lower surface in FIG. 2) of the key button 16. Thereby, as shown in FIG. 2, the key buttons 16 are inserted into the key insertion holes 10 of the upper case 8 and protrude upwardly from the upper surface of the upper case 8 when the key sheet 14 is disposed on the inner surface of the upper case 8.

As shown in FIG. 2, a plurality of fixed contacts 21 is provided on an upper surface of the switch board 15 so as to correspond to the plurality of movable contact sections 20 of the plurality of key buttons 16. When each key button 16 is pressed and deformed elastically, the movable contact 20 thereof comes in contact with the fixed contact section 21 corresponding thereto and outputs a key signal.

As shown in FIG. 4, a large number of pinholes 22 is formed in the key sheet 14 excluding portions of the key buttons 16. Specifically, the pinholes 22 are arranged at positions between the key buttons 16 and at a peripheral region of the key sheet 14. Each pinhole 22 has a small size which allows insertion of a needle for sewing.

As shown in FIG. 3, many fitting protrusions 23 to be inserted and fitted into the pinholes 22 of the key sheet 14 are formed on the inner surface of the upper case 8. Each fitting protrusion 23 has a size slightly larger than the size of the pinhole 22. The fitting protrusions 23 are arranged on the inner surface of the upper case 8 so as to correspond to the pinholes 22 of the key sheet 14.

As shown in FIG. 2, each speaker section 5 is configured by a speaker accommodating portion 24 provided in the lower case 9, a speaker 25 accommodated in the speaker accommodating portion 24, the sound discharging portion 11 provided in the upper case 8, a speaker retaining portion 26 retaining a peripheral region of an upper surface of the speaker 25, and the speaker packing portion 17 disposed between the peripheral region of the upper surface of the speaker 25 and a lower end of the speaker retaining portion 26.

As shown in FIG. 2, the speaker accommodating portion 24 is formed in a cylindrical shape in an inside of the lower case 9 so as to correspond to the sound discharging portion 11. As shown in FIGS. 1 and 2, each sound discharging portions 11 of the upper case 8 includes many small holes 11a formed in each of right and left sides of the free end edge of the upper surface of the upper case 8. As shown in FIGS. 2 and 3, the speaker retaining portion 26 is formed in a cylinder shape with a size approximately equal to the size of the speaker accommodating portion 24, and it is integrally provided on an inner surface (a lower surface in FIG. 2) of the sound discharging portion 11 of the upper case 8.

As shown in FIG. 2, each speaker packing portion 17 is formed in a ring shape so as to be inserted into the speaker retaining portion 26 provided on the upper case 8. And, each speaker packing portion 17 is formed integrally with the key sheet 14 through coupling portions 27, as shown in FIG. 4. As shown in FIGS. 2 and 4, fitting portions 28 for fitting on a lower end of the speaker retaining portion 26 are integrally formed on an outer periphery of the speaker packing portion 17.

The touch input unit 6 is configured as a handwriting input unit, and it has a transparent touch panel on a display panel, and it is formed in a flattened approximately rectangular shape as a whole. The touch input unit 6 is disposed in the touch input unit insertion portion 18 of the key sheet 14 and it is supported in the lower case 9, so that it corresponds to the input opening 12 of the upper case 8. When an input pen touches and moves on a surface of the touch panel, handwriting information such as a character according to the touch and move operation is displayed on the display panel on a lower side of the touch panel and the handwriting information is inputted into the electronic device.

The switch button 13 is configured to function as a decision key or a selector key and it is included in the key input section 4. The switch button 13 has an approximately rectangular shape, and it is coupled to the upper case 8 to make one side thereof (a lower side in FIG. 5) being bendable in up and down directions. Thereby, when the switch button 13 is pressed from the above and flexed downwardly, it presses a switch element provided inside of the lower case 9 to make the switch element perform a switch operation.

As shown in FIGS. 1 and 3, stoppers 30 are embedded in the sound discharging portions 11 on the right and left sides of the free end of the upper case 8 so as to project from the upper surface of the upper case 8 higher than the key buttons 16 of the key input section 4. Such stoppers 30 prevent the display section 7 of the second device housing 2 from pressing the key buttons 16 of the key input section 4 when the first and second device housings 1 and 2 are closed to each other. As shown in FIG. 2, a circuit board 31 is provided within the lower case 9 in a state that it is supported by supporting ribs 32 provided on the lower case 9. Further, rubber legs 33 are provided at four corners on a lower surface of the lower case 9.

Next, an assembling work for the first device housing 1 of the electronic dictionary will be explained.

Figure 5:
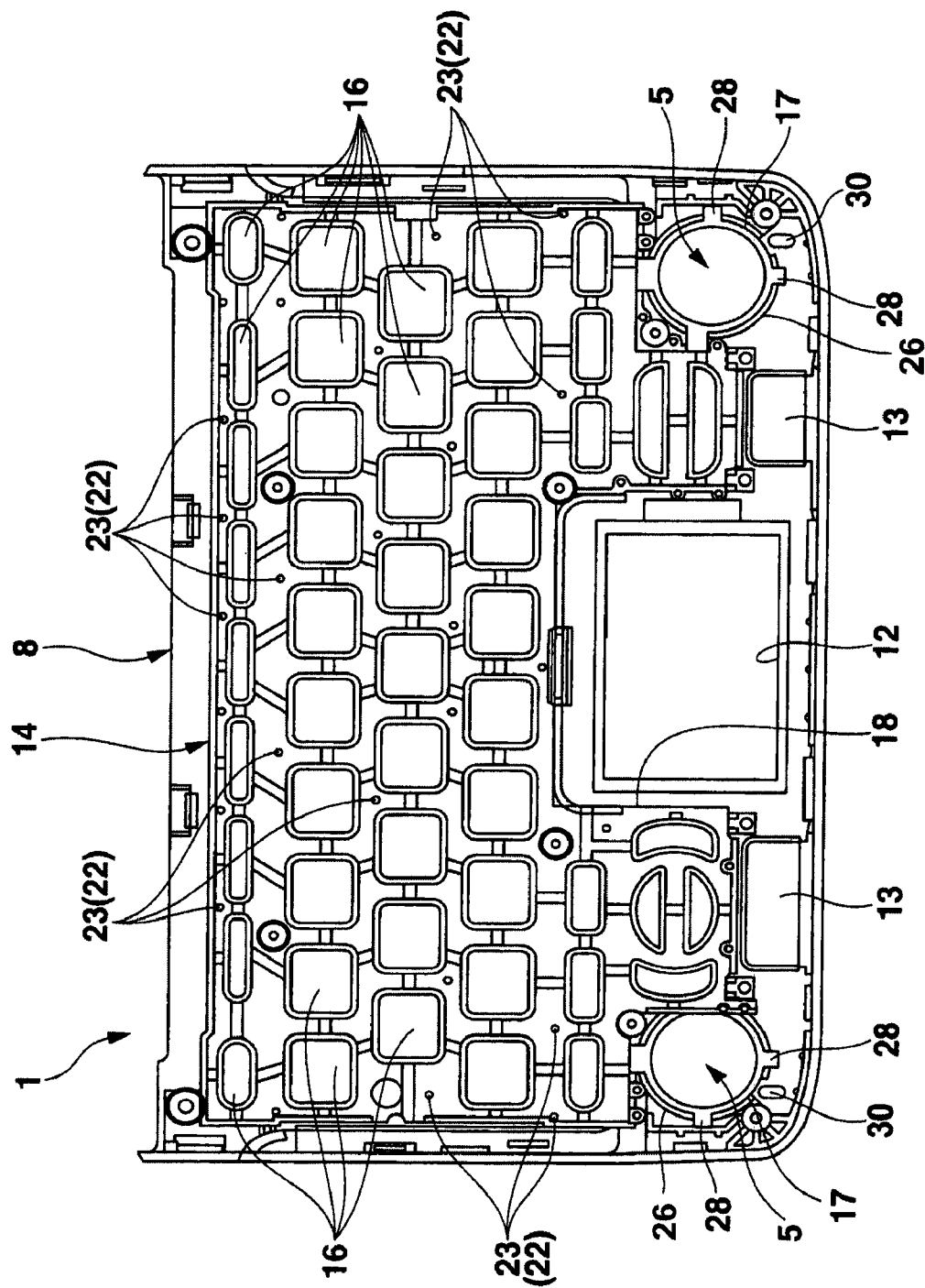
FIG. 5 is a back view, in which the key sheet shown in FIG. 4 is arranged on the inner surface of the upper case shown in FIG. 3.

First, as shown in FIG. 5, the key sheet 14 is attached to the inner surface of the upper case 8 of the first device housing 1. At this time, as shown in FIG. 2, the key buttons 16 formed on the key sheet 14 are inserted into the key insertion holes 10 of the upper case 8, and the speaker packing portions 17 formed integrally with the key sheet 14 are inserted into the retaining portions 26 of the upper case 8. Further, the touch input unit insertion portion 18 of the key sheet 14 is positioned to correspond to the input opening 12 of the upper case 8, as shown in FIG. 5.

In this state, the fitting protrusions 23 provided on the inner surface of the upper case 8 are inserted and fitted into the pinholes 22 provided on the key sheet 14. And, the fittings 28 provided on the peripheries of the speaker packing portions 17 are fitted on the lower ends of the speaker pressing portions 26 of the upper case 8, as shown in FIG. 2. Thereby, as shown in FIG. 5, the key sheet 14 is brought in close contact with the inner surface of the upper case 8 without sagging, and the speaker packing portions 17 formed integrally with the key sheet 14 are securely attached to the speaker retaining portions 26 of the upper case 8 in a close contact state without flapping upward and downward. Even if the upper case 8 is inverse upside down in this state, the key sheet 14 does not fall off the upper case 8.

Thereafter, the switch board 15 is disposed below the key sheet 14 to make the plurality of fixed contact sections 21 provided on the upper surface of the switch board 15 correspond to the movable contact points 20 of the plurality of key button sections 16 with a space therebetween, and, in at the same time, the speakers 25 are accommodated in the speaker accommodating portions 24 of the lower case 9 and the touch input unit 6, switch elements (not shown), and the circuit board 31 are assembled to predetermined positions of the lower case 9. Finally, the upper case 8 is put on the lower case 9 to be joined thereto. Thereby, the speaker packing portions 17 of the key sheet 14 press the peripheral regions of the upper surfaces of the speakers 25 accommodated in the speaker accommodating portions 24 of the lower case 9.

The completed first device housing 1 provided with the key input section 4, the speaker sections 5, the touch input unit 6, and the switch buttons 13 is pivotally coupled to the second device housing 2 provided with the display section 7 by the hinge 3, as shown in FIG. 1.

In the above mentioned first embodiment, since the speaker packing portions 17 are formed integrally with the key sheet 14, packing members are not required as separate parts and the number of parts required for the electronic device is reduced. Further, since the speaker packing portions 17 can be assembled to the upper case 8 simultaneously with assembling of the key sheet 14 to the upper case 8, simplification of the assembling work of the first device housing 1 of the electronic dictionary can be achieved.

Second Embodiment

Next, an electronic dictionary according to a second embodiment of the present invention will be explained with reference to FIGS. 6 to 8.

In this embodiment, same sections or portions or members or the like as those in the electronic dictionary according to the first embodiment shown in FIGS. 1 to 5 are designated by the same reference numerals as those in the first embodiment, and detailed descriptions thereof are omitted.

The electronic dictionary of this embodiment is different from the electronic dictionary of the above described first embodiment in that switch covers 40 are formed integrally with the key sheet 14 and the switch covers 40 cover the switch elements 41 provided on the lower case 9 of the first device housing 1.

Figure 6:
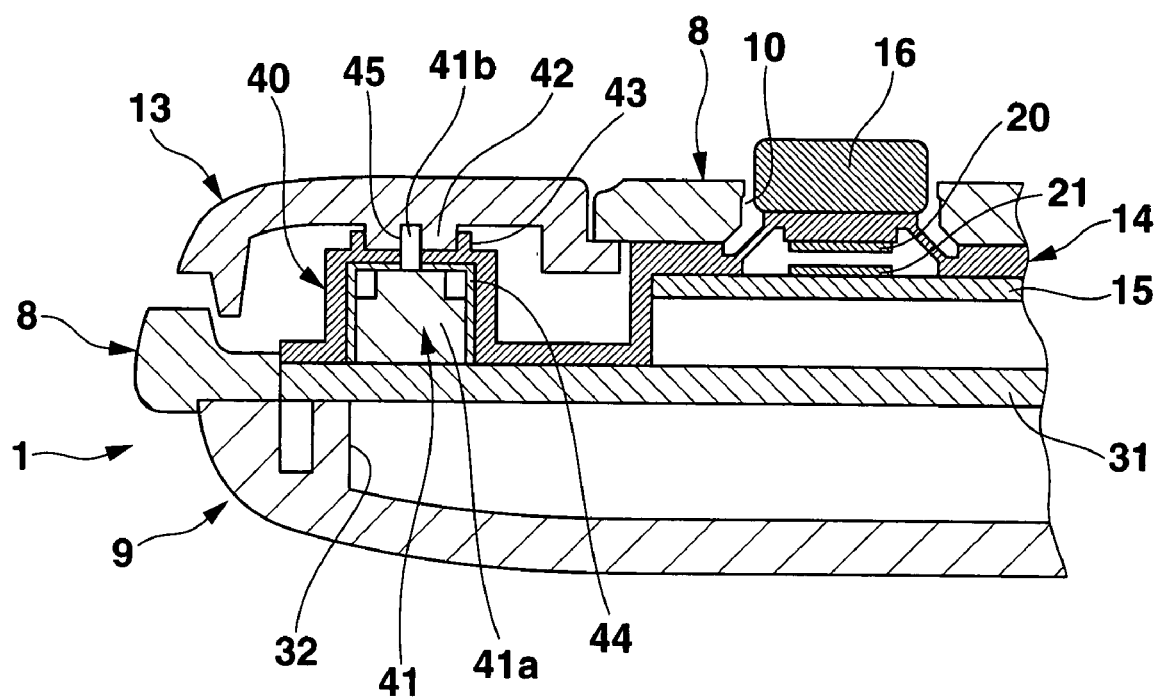
FIG. 6 is an enlarged vertical sectional view of a main portion of an electronic dictionary according to a second embodiment of the present invention.

Each switch element 41 is a tact switch, and, as shown in FIG. 6, an operating piece 41b is provided in a switch main body 41a and the switch 41a outputs a signal when its projecting end is pushed. The switch element 41 is attached on the circuit board 31 provided in the lower case 9, and it is disposed to correspond to a lower side of the switch button 13 provided between each speaker section 5 and the touch input unit 6 in the free end edge of the upper case 8.

The switch cover 40 covers an outer surface of the switch element 41 excepting a bottom thereof, and it is formed integrally with the key sheet 14.

Figure 7:
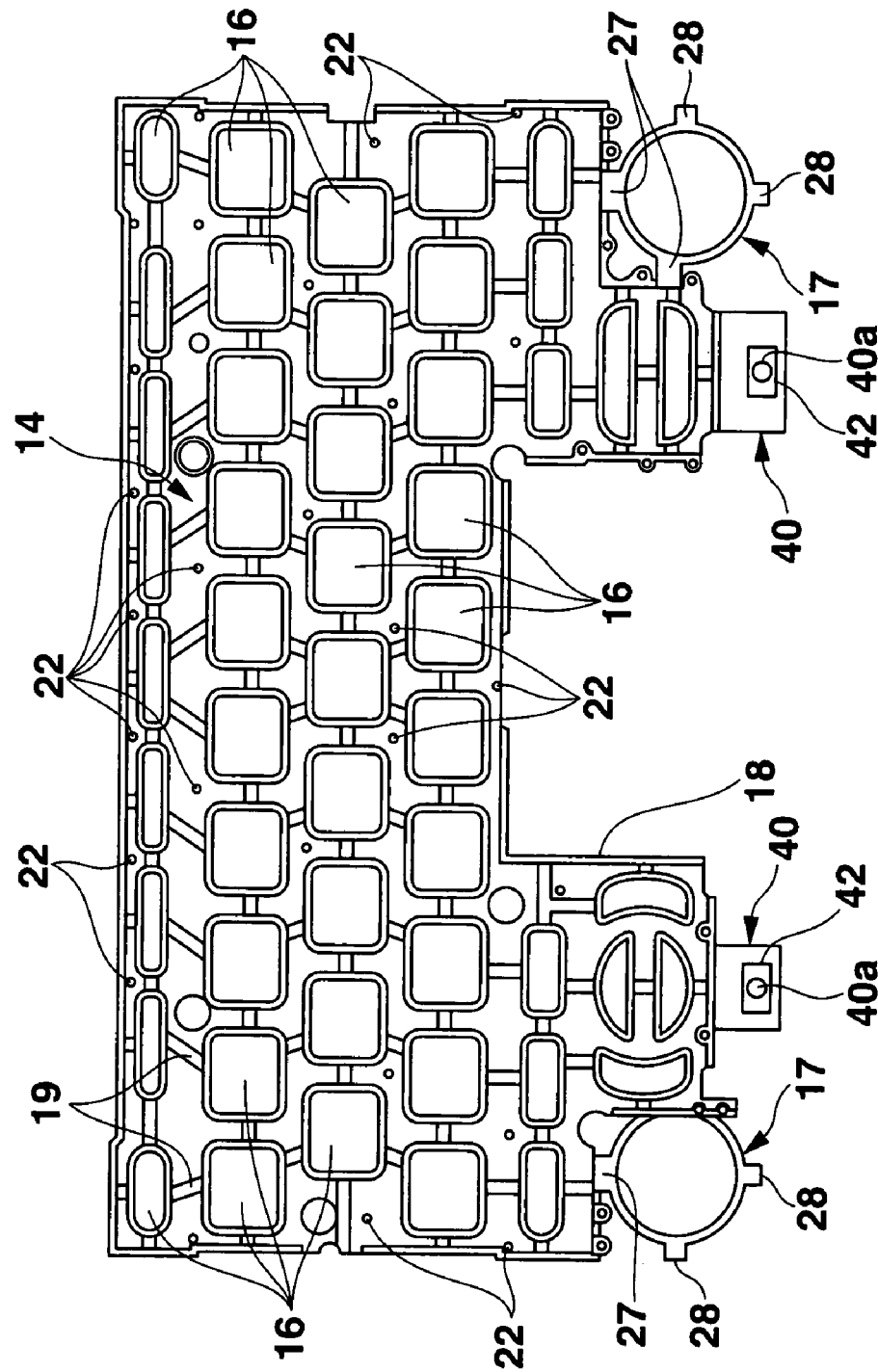
FIG. 7 is a back view of a key sheet, a part of which is shown in FIG. 6.
Figure 8:
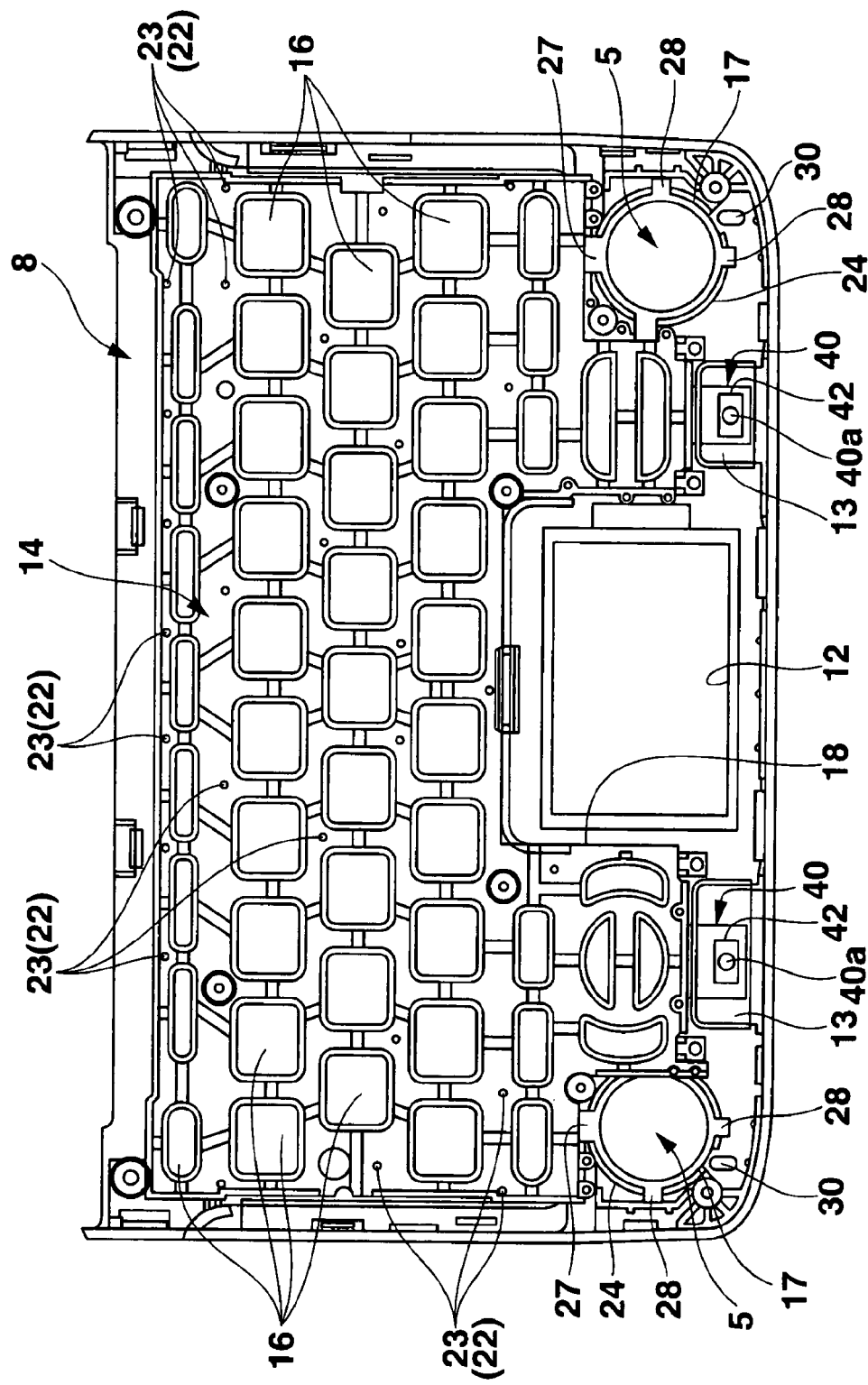
FIG. 8 is a back view, in which the key sheet shown in FIG. 7 is arranged on an inner surface of an upper case of a first device housing in the second embodiment of the present invention.

As shown in FIGS. 6 and 7, the switch cover 40 is provided with an insertion hole 40a through which the operating piece 41b of the switch element 41 projects upwardly. A frame-shaped fitting recess 43 is provided on an upper surface of the switch cover 40, and a pressing protrusion 42 provided on an inner surface of the switch button 13 of the upper case 8 is fitted in the fitting recess 43. A shielding film 44 for desensitization made from electrically conductive material such as carbon is provided on an inner surface of the switch cover 40.

The switch button 13 has the approximately rectangular shape like that of the first embodiment, and it is configured to be bendable to move one side (a left side in FIG. 6) thereof in up and down directions. As shown in FIG. 6, a fitting hole 45 is formed in the pressing protrusion 42 provided on the inner surface of the switch button 13, and the operating piece 41b of the switch element 41 is fitted in the fitting hole 45. Thereby, when the switch button 13 is pressed to be flexed downwardly, it presses the operating piece 41b of the switch element 41 provided in the lower case to make the switch element 41 perform its switch action.

In such an electronic dictionary, the same technical advantages as those obtained by the electronic dictionary of the first embodiment can be obtained. Further, since the switch covers 40 for covering the switch elements 41 are formed integrally with the key sheet 14 in the second embodiment, switch covers are not required as separate parts and the number of parts required for the electronic device is reduced. Further, since the switch covers 40 can be assembled to the upper case 8 simultaneously with assembling of the key sheet 14 to the upper case 8, simplification of the assembling work of the first device housing 1 of the electronic dictionary can be achieved.

Third Embodiment

Next, an electronic dictionary according to a third embodiment of the present invention will be explained with reference to FIGS. 9 to 13.

In this embodiment, same sections or portions or members or the like as those in the electronic dictionary according to the first embodiment shown in FIGS. 1 to 5 are designated by the same reference numerals as those in the first embodiment, and detailed descriptions thereof are omitted.

The electronic dictionary according to the third embodiment is different from the electronic dictionary according to the first embodiment in that stoppers 50 are formed integrally with the key sheet 14 and the stoppers 50 are fitted into stopper holes 51 formed in the upper case 8 of the first case 1 so that the stoppers 50 are protruded upward from the upper case 8.

Figure 9:
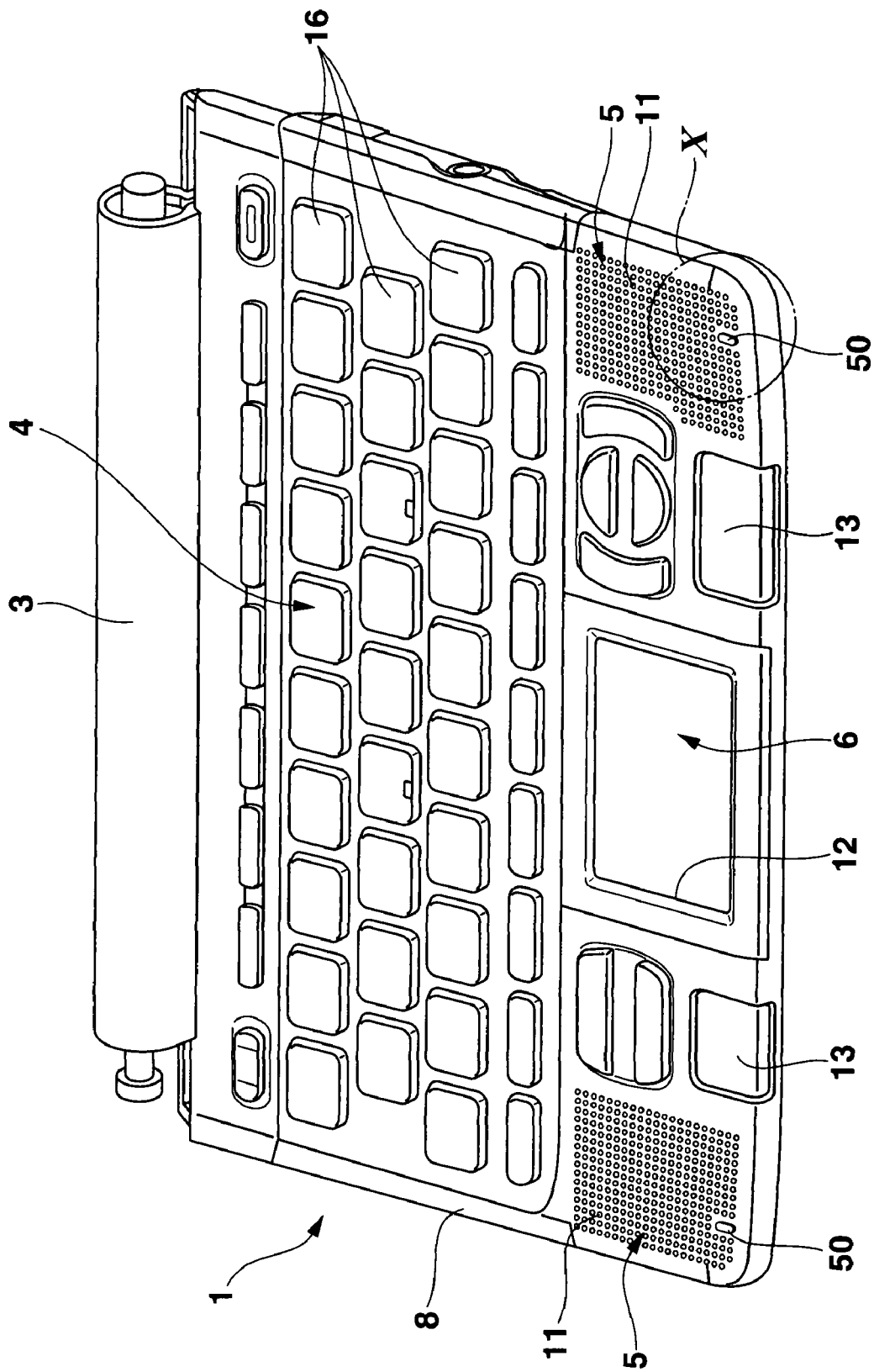
FIG. 9 is a perspective view of a first device housing of an electronic dictionary according to a third embodiment of the present invention.
Figure 10:
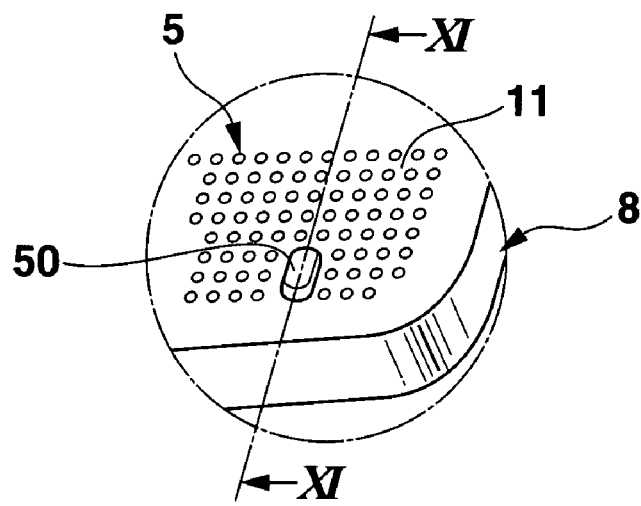
FIG. 10 is an enlarged perspective view of a part of a sound discharging portion, designated by X, in the first device housing shown in FIG. 9.
Figure 11:
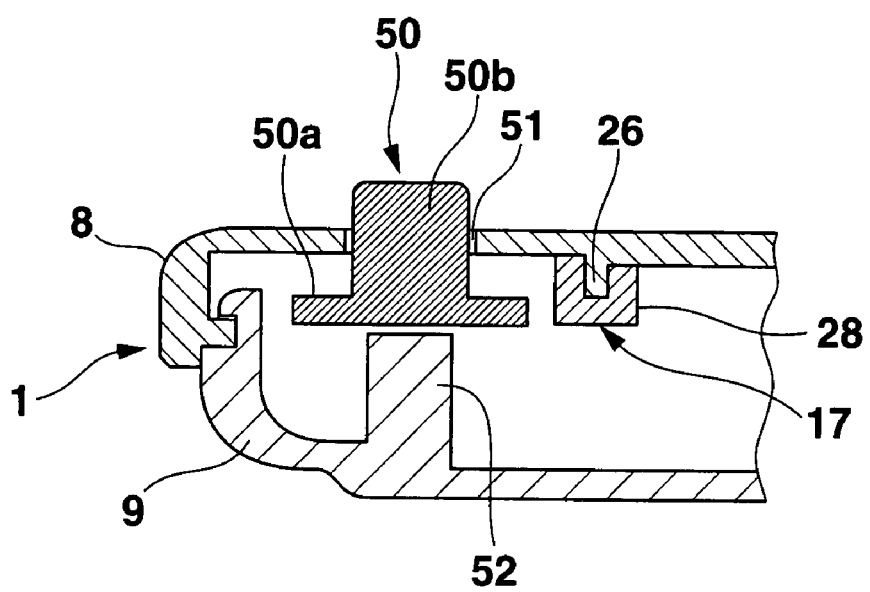
FIG. 11 is a vertical sectional view along a line XI-XI in FIG. 10.
Figure 12:
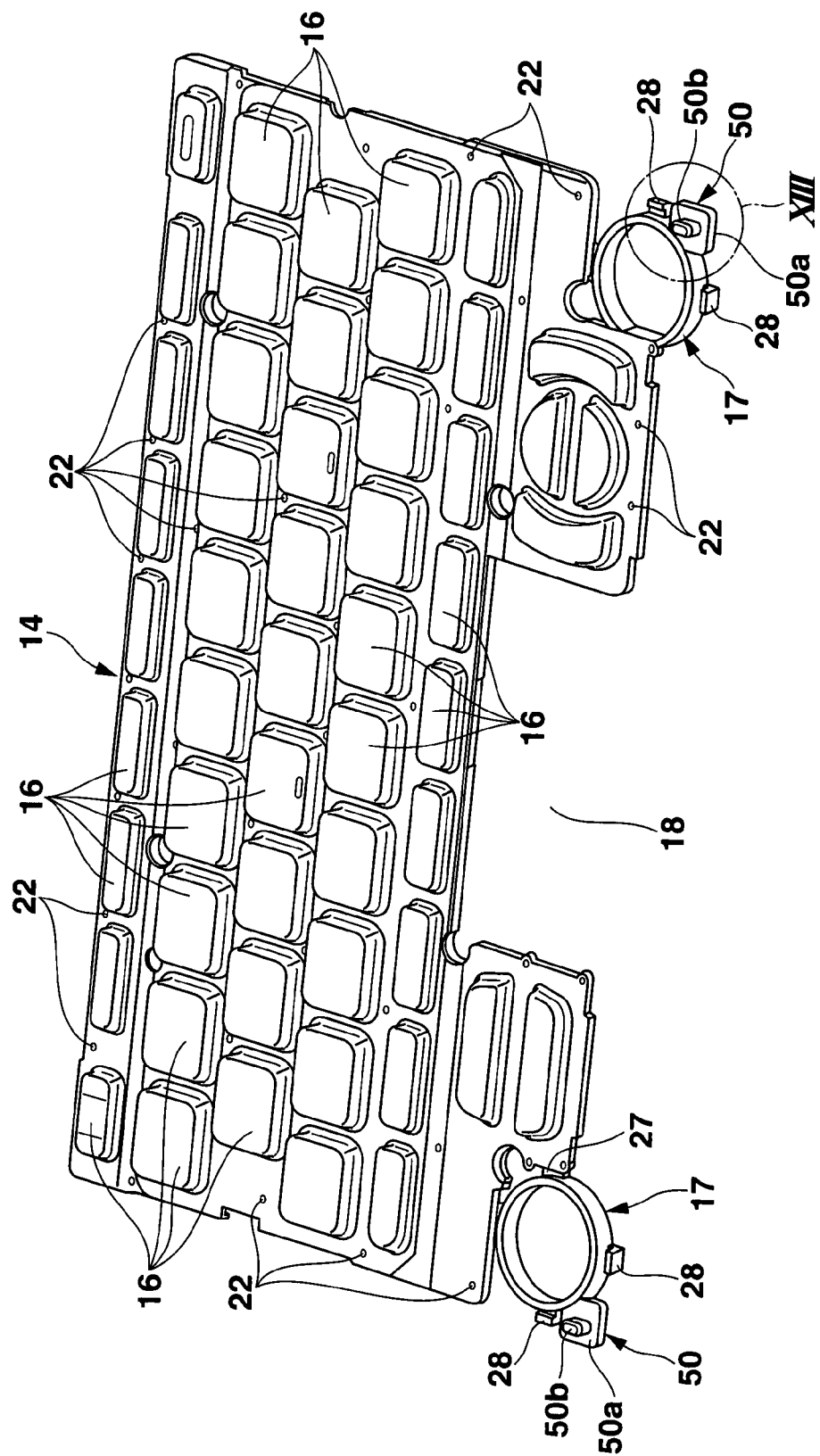
FIG. 12 is a perspective view of a key sheet, a part of which is shown in FIG. 11.
Figure 13:
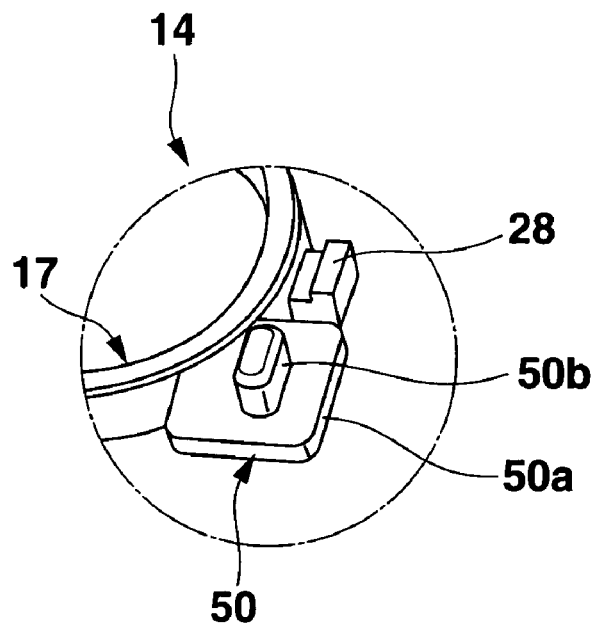
FIG. 13 is an enlarged perspective view of a part of a stopper portion, designated by XIII, in the key sheet shown in FIG. 12.

In this embodiment, as shown in FIGS. 9 to 11, the stopper holes 51 are formed at positions in the sound discharging portions 11 of the upper case 8 other than the positions of the speaker retaining portions 26 so as to pass through in up and down directions. As shown in FIGS. 12 and 13, each stopper 50 is integrally formed on an outer periphery of each speaker packing portion 17 of the key sheet 14. Specifically, the stopper 50 includes a coupling plate 50a integrally formed on the outer periphery of the speaker packing portion 17 and a stopper protrusion 50b integrally formed on the coupling plate 50a.

When the key sheet 14 is attached to the inner surface of the upper case 8, the coupling plate 50a is in contact with the lower surface of the sound discharging portion 11 and the stopper protrusion 50b is inserted into the stopper hole 51 so that the stopper protrusion 50b projects upward from the upper surface of the upper case 8. As shown in FIG. 11, a supporting rib 52 for supporting the stopper protrusion 50b is provided on the inner surface of the lower case 9, and the supporting rib 52 abuts on the lower surface of the stopper 50 to prevent the stopper protrusion 50b from being pressed into the upper case 8 when the upper case 8 is joined to the lower case 9.

In such an electronic dictionary, the same technical advantages as those obtained by the electronic dictionary of the first embodiment can be obtained. Further, since the stoppers 50 are formed integrally with the key sheet 14, in comparison with stoppers 30 in the first embodiment which are formed separately as separate parts from the key sheet 14, the number of parts required for the electronic device is reduced. Further, since the stoppers 50 can be assembled to the upper case 8 simultaneously with assembling of the key sheet 14 and the speaker packing portions 17 to the upper case 8, simplification of the assembling work of the first device housing 1 of the electronic dictionary can be achieved.

In the above described third embodiment, the stoppers 50 are integrally formed on the outer peripheries of the speaker packing portions 17 integrally formed on the key sheet 14. But, the stoppers 50 may be integrally formed on both sides of the end edge of the key sheet 14 corresponding to the right and left sides of the free end edge of the upper case 8.

Fourth Embodiment

Next, an electronic dictionary according to a fourth embodiment of the present invention will be explained with reference to FIGS. 14 to 16.

In this embodiment, same sections or portions or members or the like as those in the electronic dictionary according to the first embodiment shown in FIGS. 1 to 5 are designated by the same reference numerals as those in the first embodiment, and detailed descriptions thereof are omitted.

The electronic dictionary of the fourth embodiment is different from the electronic dictionary of the first embodiment in that rubber legs 55 arranged on the lower surface of the lower case 9 of the first device housing 1 are formed integrally with the key sheet 14.

Figure 15:
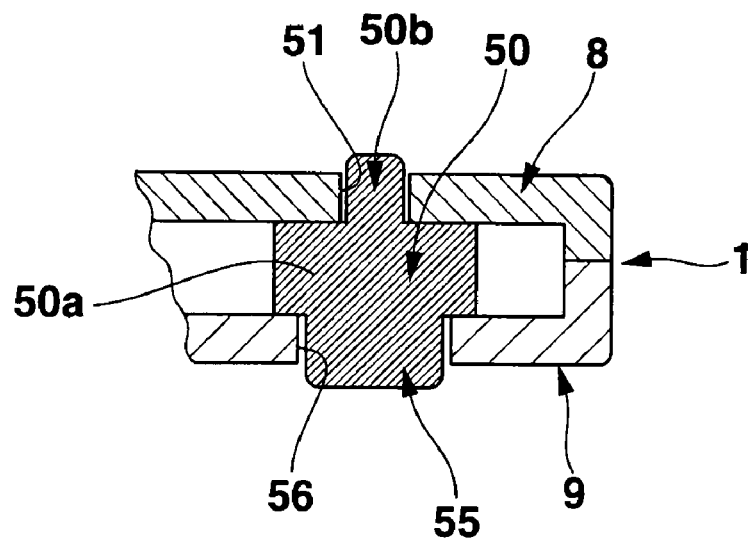
FIG. 15 is a vertical sectional along a line XI-XI in FIG. 14.
Figure 14:
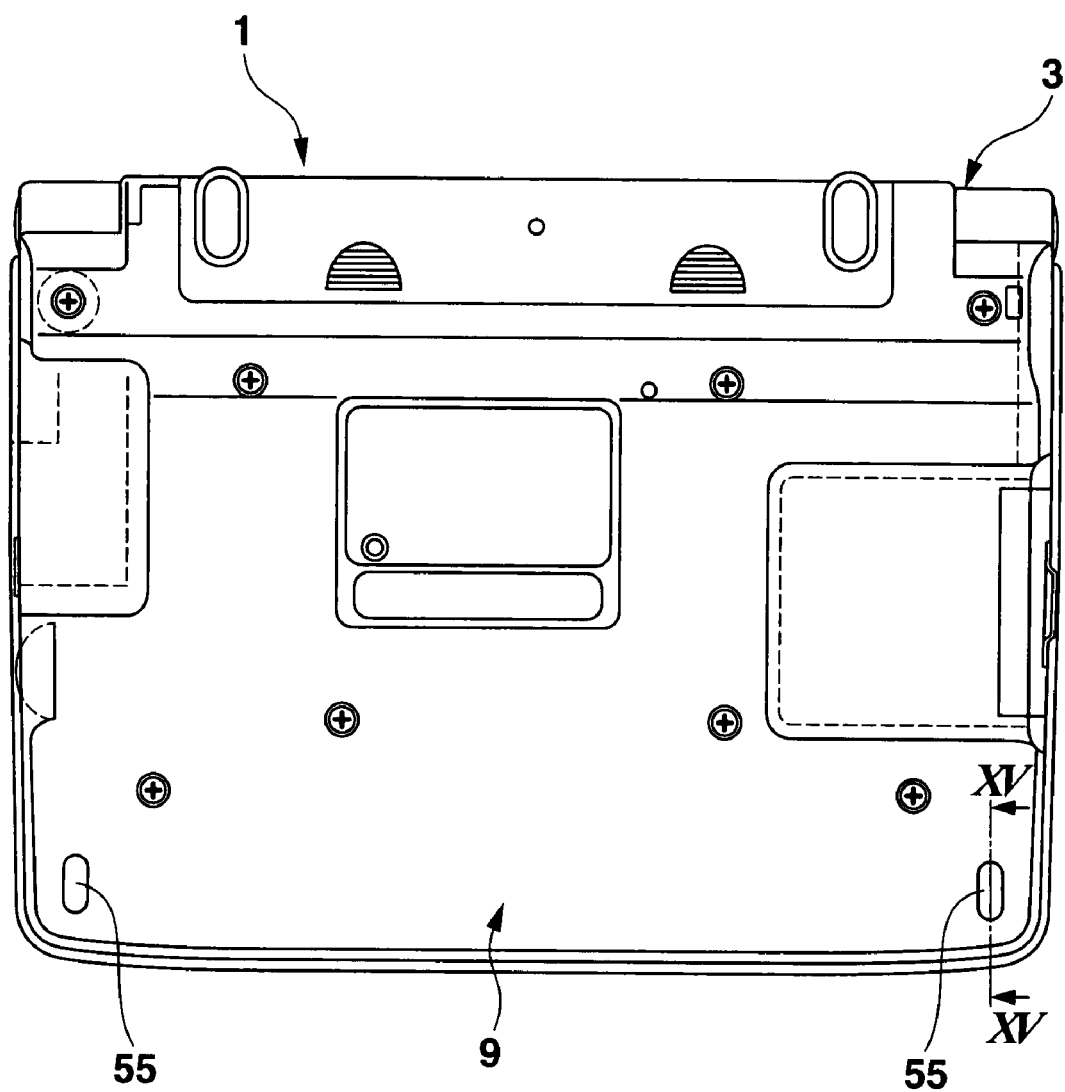
FIG. 14 is a bottom view of a first device housing of an electronic dictionary according to a fourth embodiment of the present invention.
Figure 16:
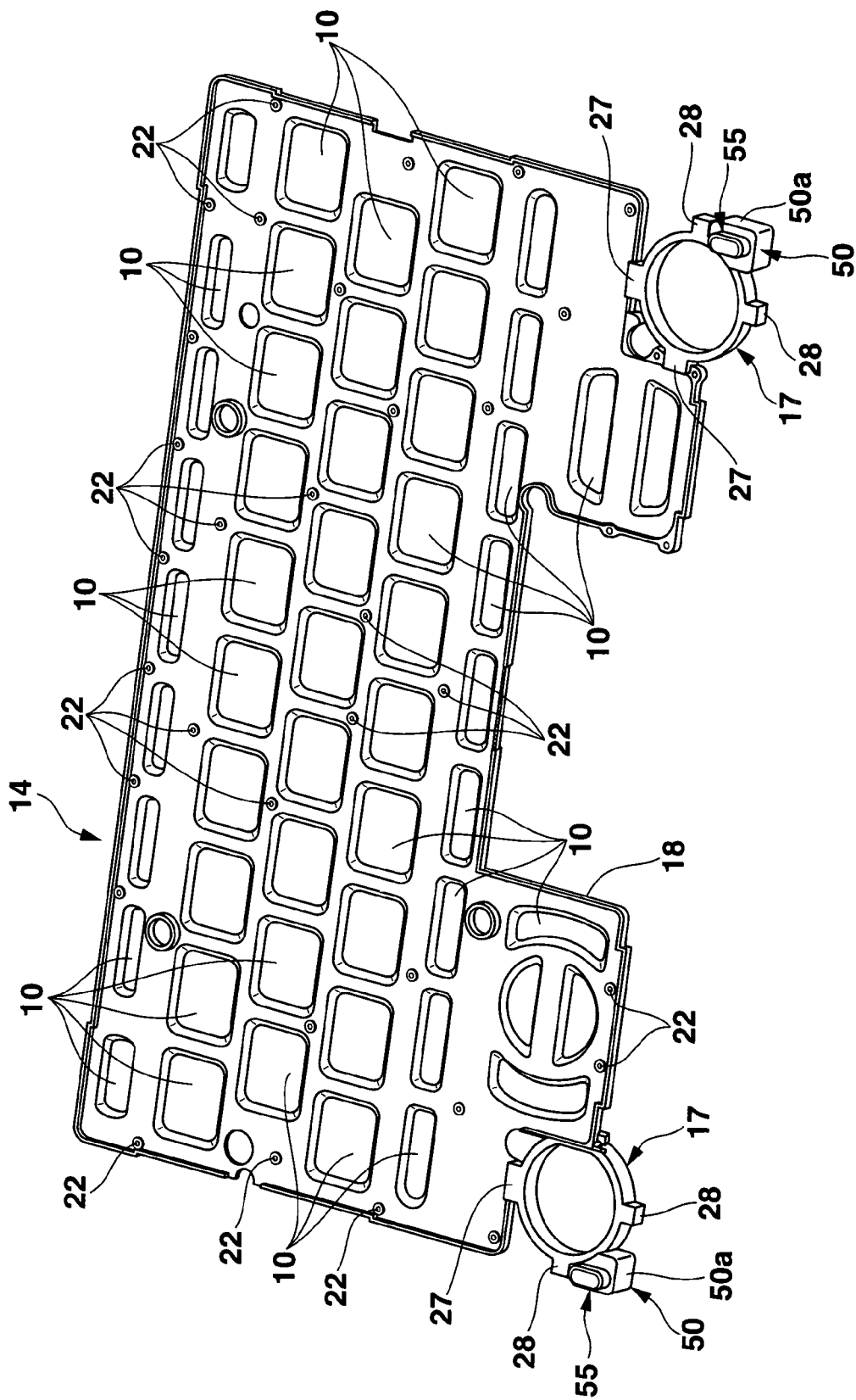
FIG. 16 is a perspective view of a key sheet with rubber legs, a part of which is shown in FIG. 15.

In this embodiment, as shown in FIGS. 14 and 15, slender oval-shaped leg insertion holes 56 are formed in both sides of the free end edge of the lower case 9 so as to correspond to the stoppers 50 of the key sheet 14. As shown in FIGS. 15 and 16, each rubber leg 55 is integrally formed on the lower surface (the upper surface in FIG. 16) of the stopper 50 integrally formed on the outer periphery of the speaker packing portion 17 of the key sheet 14. The rubber leg 55 is configured to have an approximately oval cylindrical shape to be fitted into the leg insertion hole 56 of the lower case 9, and a lower end (an upper end in FIG. 16) thereof projects downwardly from the lower surface of the lower case 9. When the lower surface of the lower case 9 of the first device housing 1 is placed on an placing surface of an object such as a table or the like, the projected lower ends of the rubber legs 55 are in contact with the placing surface of the object, thereby preventing the lower case 9 from sliding on the placing surface of the object.

In such an electronic dictionary, a function and an effect similar to those in the third embodiment can be obtained. Further, since the rubber legs 55 are integrally formed on the lower surfaces of the stoppers 50, in comparison with rubber legs 33 in the first embodiment which are formed separately as separate parts from the key sheet 14, the number of parts required for the electronic device is reduced. Further, since the rubber legs 55 can be assembled to the upper case 8 simultaneously with assembling of the key sheet 14, the speaker packing portions 17 and the stoppers 50 to the upper case 8, simplification of the assembling work of the first device housing 1 of the electronic dictionary can be achieved.

In the above described fourth embodiment, the rubber legs 55 are integrally formed on the lower surfaces of the stoppers 50 integrally formed on the outer peripheries of the speaker packing portions 17 of the key sheet 14. But, the rubber legs 50 may be integrally formed on both sides of the end edge of the key sheet 14 corresponding to the right and left sides of the free end edge of the upper case 8.

Fifth Embodiment

Next, an electronic dictionary according to a fifth embodiment of the present invention will be explained with reference to FIGS. 17 to 21.

In this embodiment, same sections or portions or members or the like as those in the electronic dictionary according to the first embodiment shown in FIGS. 1 to 5 are designated by the same reference numerals as those in the first embodiment, and detailed descriptions thereof are omitted.

The electronic dictionary of the fifth embodiment is mainly different from the electronic dictionary of the first embodiment in that a peripheral edge region 60 of the key sheet 14 extends to a dividing line between the upper case 8 and the lower case 9.

The key sheet 14 is made from elastic material such as rubber or elastomer or the like the first embodiment. As shown in FIG. 18, the key sheet 14 is formed with the key buttons 16 arranged lengthwise and crosswise, and further it is formed integrally with the speaker packing portions 17 for the speaker sections 5.

In this embodiment, a large number of pinholes 22 is formed in the key sheet 14 excluding portions of the key buttons 16. Each pinhole 22 has a small size which allows insertion of a needle for sewing. Like in the first embodiment, the key sheet 14 is attached to the inner surface of the upper case 8 by inserting and fitting the fitting protrusions 23 provided on the inner surface of the upper case 8 into the pinholes 22.

Figure 19:
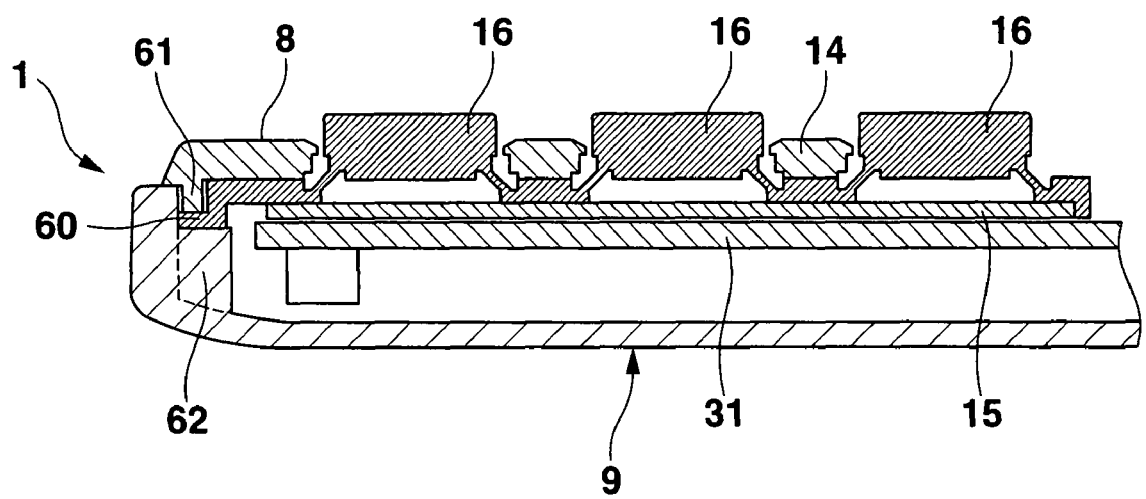
FIG. 19 is a vertical sectional view along a line FIX-FIX in FIG. 17.
Figure 20:
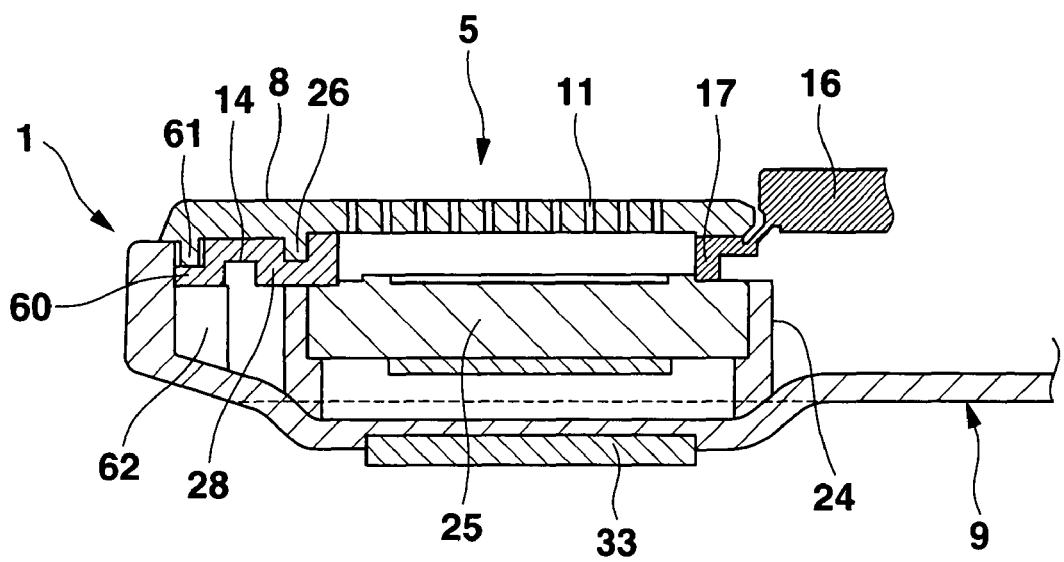
FIG. 20 is a vertical sectional view along a line XI-XI in FIG. 17.

As shown in FIGS. 18 to 20, the key sheet 14 is configured to extend its peripheral edge region 60 to the dividing line between the upper case 8 and the lower case 9. Specifically, a retaining protrusion 61 is provided on an inner surface (a lower surface in FIG. 19) of the whole periphery of the upper case 8. The retaining protrusion 61 projects downward and locates along an inner side surface of the lower case 9.

Retaining ribs 62 are provided at predetermined intervals on the inner surface (the inner side surface and the upper surface in FIG. 19) of the periphery of the lower case 9, and the retaining ribs 62 correspond to the lower end of the retaining protrusion 61 of the upper case 8.

The peripheral edge region 60 of the key sheet 14 is formed in a step shape, the upper surface of which is in contact with the lower end of the retaining protrusion 61 at the periphery of the upper case 8, and the extending end of which is in contact with inner side surface of the lower case 9, and the step of the peripheral edge region 60 of the key sheet 14 is sandwiched between the retaining protrusion 61 of the upper case 8 and the retaining ribs 62 of the lower case 9. In this embodiment, as shown in FIG. 18, approximately rectangular openings 63 are formed in the key sheet 14 to correspond to the speaker sections 5, and the speaker packing portions 17 are provided in the openings 63 like the first embodiment.

Each speaker section 5 includes the speaker accommodating portion 24 provided on the lower case 9, the speaker 25 accommodated in the speaker accommodating portion 24, the sound discharging portion 11 provided in the upper case 8 to correspond to the speaker 25, the speaker retaining portion 26 pressing the peripheral edge region of the upper surface of the speaker 25, and the speaker packing portion 17 disposed between the peripheral edge region of the upper surface of the speaker 25 and the speaker retaining portion 26 like the first embodiment.

Figure 21:
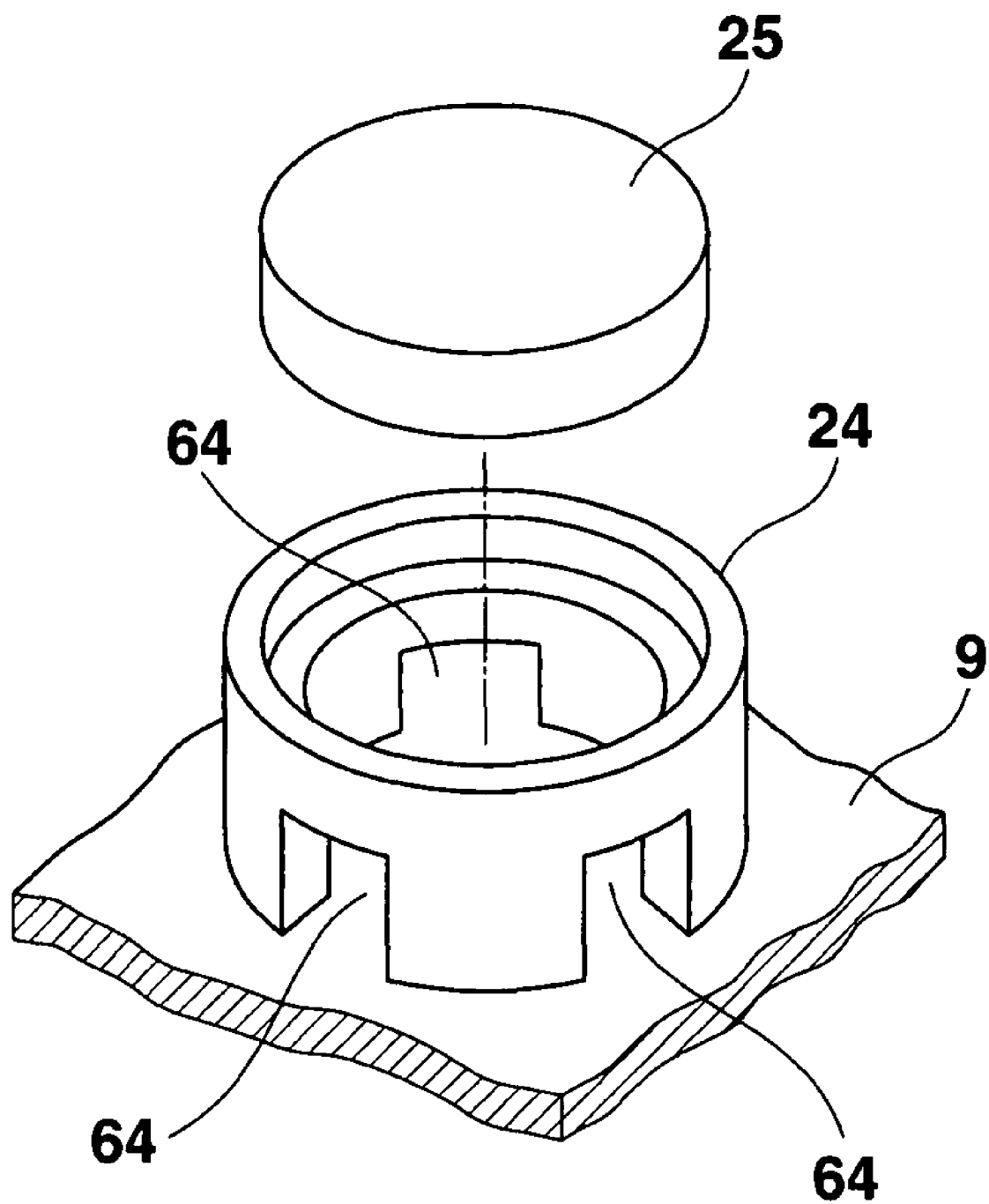
FIG. 21 is an enlarged and exploded perspective view of a speaker accommodating portion shown in FIG. 20.

In this embodiment, as shown in FIG. 21, the speaker accommodating portion 24 is formed in an approximately cylindrical shape, and small openings 64 are formed at predetermined positions of the speaker accommodating portion 24, for example, at a plurality of positions of the peripheral surface of the speaker accommodating portion 24 below the speaker 25 disposed therein. Thereby, a sound space positioned below the speaker 25 is formed as a large space produced by combining the inner space positioned below the speaker 25 in the inner side of the speaker accommodating portion 24 with the external space positioned in the outer side of the speaker accommodating portion 24 between the lower case 9 and the key sheet 14 through the plurality of openings 64.

As shown in FIG. 20, the speaker packing portion 17 has a ring shape and it is inserted into the speaker retaining portion 26 provided on the upper case 8. As shown in FIGS. 18 and 20, the fittings 28 for fitting on the lower end of the speaker retaining portion 26 are integrally formed at predetermined positions on the outer periphery of the speaker packing portion 17 in a state that they are connected to the peripheral edge region 60 of the key sheet 14.

As shown in FIG. 19, the switch board 15 is arranged on the lower surface of the key sheet like the first embodiment, and the circuit board 31 is arranged below the switch board 15. As shown in FIG. 20, the rubber legs 33 are provided on the positions of the lower surface of the lower case 9 so as to correspond to the speaker sections 5 like the first embodiment.

In such an electronic dictionary, a function and an effect similar to those in the first embodiment can be obtained. Further, since the peripheral edge region 60 of the key sheet 14 is extended to the dividing line between the upper case 8 and the lower case 9 in the first device housing 1, a waterproofing between the upper case 8 and the lower case 9 can be secured and an air-tightness of the space in the lower side of the speaker section 5, namely, that of the space in the lower case 9 can be secured, therefore the sound leakage from the speaker sections 5 in the first device housing 1 is prevented, so that the sufficient sound volume can be assured.

In the fifth embodiment, the speaker sections 5 are provided on the both the sides of the free end region of the first device housing 1. However, only one speaker section 5 may be provided on one of the both the sides of the free end region of the first device housing 1. In such a configuration, since the number of the speaker section 5 is one, the sufficient sound volume can not be secured if the air-tight in the sound space for the speaker section 5 in the lower case 9 is insufficient and the sound leakage occurs. However, as in the fifth embodiment, by extending the peripheral edge region 60 of the key sheet 14 to the dividing line between the upper case 8 and the lower case 9 in the first device housing 1 and by sandwiching the extended peripheral edge region 60 of the key sheet 14 between the retaining protrusion 61 of the upper case 8 and the retaining ribs 62 of the lower case 9, the sufficient sound volume can be secured even if only one speaker section 5 is provided.

In the first to fifth embodiments, the electronic dictionary is the foldable type where the first and second device housings 1 and 2 are pivotally coupled to each other by the hinge 3. However, the electronic dictionary may be a non-foldable type where only one device housing configured by an upper case and a lower case is used and where all of the key input section 4, the speaker sections 5, the touch input unit 6, and the display section 7 are disposed in the upper case of the device housing.

In the first to fifth embodiments, the electronic device according to the present invention is the electronic dictionary. But, the electronic device according to the present invention may be various electronic devices having a key input section, such as an electronic notebook, an electronic calculator, a mobile phone, or a PDA (personal digital assistant).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device comprising:
    a device housing including a first case which has an outer surface and an inner surface, and a second case which has an outer surface and an inner surface and which is combined with the first case such that the inner surface of the second case faces the inner surface of the first case;
    a key input section which is housed in the device housing; and
    a speaker section which is housed in the device housing;
    wherein the key input section includes:
        a key sheet which is: (i) arranged along the inner surface of the first case, (ii) integrally provided with a plurality of buttons projecting toward the inner surface of the first case and having a peripheral edge region surrounding the buttons, and (iii) provided with a plurality of pin holes at a plurality of positions between the buttons and along the peripheral edge portion; and
        a plurality of contacts which are provided within the second case to correspond to the buttons, and which are actuatable by the buttons;
    wherein the first case is provided with a plurality of openings which pass through the first case and through which the plurality of buttons are exposed in the outer surface of the first case, and a plurality of fitting projections which are inserted into and fitted in the plurality of pin holes of the key sheet;
    wherein the speaker section includes:
        a sound discharge opening which is formed in the first case and which passes through the first case;

a speaker which is provided within the second case to correspond to the sound discharge opening, and which discharges sound toward the sound discharge opening;

a speaker retaining portion which is provided on the inner surface of the first case, and which faces a periphery of a sound discharge opening directing surface of the speaker; and a speaker packing portion which is provided on the key sheet and arranged between the periphery of the sound discharge opening directing surface of the speaker and the speaker retaining portion, and which has a fitting configured to fit with the speaker retaining portion; and wherein the peripheral edge region of the key sheet extends to a divisional line between the first case and the second case while the first case and the second case are combined with each other.

2. The electronic device according to claim 1, further comprising:

a switch element provided within the second case of the device housing, and a switch cover which covers the switch element, and which is integrally formed on the key sheet.

3. The electronic device according to claim 1, further comprising:

a stopper hole which is formed in the first case of the device housing, and which passes through the first case, and a stopper which is integrally formed on the key sheet and inserted into the stopper hole, and which projects out from the outer surface of the first case.

4. The electronic device according to claim 1, further comprising:

a leg insertion hole which is formed in the second case of the device housing, and which passes through the second case, and a leg which is integrally formed on the key sheet and inserted into the leg insertion hole, and which projects out from the outer surface of the second case.

5. The electronic device according to claim 1, further comprising:

a touch input unit provided within the second case of the device housing, a touch input unit insertion opening provided in the key sheet, and in which the touch input unit is inserted, and an input opening provided in the first case to correspond to the touch input unit insertion opening of the key sheet.

6. The electronic device according to claim 1, further comprising:

a display housing which houses a display section; and a hinge which connects the display housing to the device housing so that the display housing is rotationally movable between a closed position in which the display section overlaps with the outer surface of the first case of the device housing, and an open position in which the display section is disposed away from the outer surface of the first case.

* * * * *